United States Patent
Leu et al.

(10) Patent No.: US 7,011,440 B2
(45) Date of Patent: Mar. 14, 2006

(54) PLANAR SURFACE ILLUMINATOR

(75) Inventors: Chales Leu, Fremont, CA (US);
Ga-Lane Chen, Gremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 47 days.

(21) Appl. No.: 10/657,961

(22) Filed: Sep. 8, 2003

(65) Prior Publication Data

US 2004/0120138 A1   Jun. 24, 2004

(30) Foreign Application Priority Data

Dec. 20, 2002   (TW) .............................. 91136972 A

(51) Int. Cl.
*F21V 8/00*   (2006.01)
(52) U.S. Cl. ...................... 362/621; 362/618; 362/624
(58) Field of Classification Search ................ 362/558, 362/27, 31, 561, 339, 331, 555, 615, 621, 362/622, 623, 624, 617, 618
See application file for complete search history.

(56) References Cited

U.S. PATENT DOCUMENTS

| 5,886,759 | A | 3/1999 | Mashino et al. |
| 6,196,691 | B1 | 3/2001 | Ochiai |
| 6,474,826 | B1 * | 11/2002 | Tanaka et al. ................ 362/31 |
| 6,648,485 | B1 * | 11/2003 | Colgan et al. ................ 362/31 |

* cited by examiner

*Primary Examiner*—Sandra O'Shea
*Assistant Examiner*—Guiyoung Lee
(74) *Attorney, Agent, or Firm*—Wei Te Chung

(57) ABSTRACT

A planar surface illuminator (20) for installation below a liquid crystal display panel includes a light guide plate (22) and a plurality of point light sources (21). The light guide plate has an optical input surface (221) and an optical output surface (222). The point light sources are positioned adjacent to the optical input surface. A number of scattering dots (23) are positioned on and integrated with the optical input surface. At least three scattering dots corresponding to each one point light source are provided, for converting a beam having a Gaussian distribution received from the point light source to a beam having a uniform light intensity which illuminates the light guide plate. This promotes uniform intensity light emission from the optical output surface to illuminate the liquid crystal display panel.

18 Claims, 4 Drawing Sheets

PLANAR SURFACE ILLUMINATOR

BACKGROUND OF THE INVENTION

1. Field of the Invention

The present invention relates to a planar surface illuminator, and especially to a planar surface illuminator using point sources and provided below a liquid crystal display (LCD) panel.

2. Description of the Related Art

Most users expect displays in portable devices, such as laptop and notebook computers, mobile phones and game devices, to have large, clear, bright viewing screens, equaling the performance of the cathode-ray-tube (CRT) monitors sitting on their desks. LCDs are one type of flat panel display (FPD) which satisfies these expectations. However, because liquid crystals are not self-luminescent, LCDs need a planar surface illuminator which offers sufficient luminance (brightness) in a planar surface. Typically, planar surface illuminators have one of two types of light sources, one being linear sources, such as a cold cathode fluorescent lamp (CCFL), and the other being point sources, such as a light emitting diode (LED). Different types of light sources require different planar surface illuminator design structures.

As shown in FIG. 6, a conventional planar surface illuminator 10 which uses point light sources comprises a light guide plate 15 and three point sources 13 positioned at one side of the light guide plate 15. The light guide plate 15 couples with light beams emitted from the point sources 13 to create a planar surface illuminator for irradiating a liquid crystal panel (not shown). The point sources 13 are LEDs, each of which has an emission beam known as a Gaussian beam. The Gaussian beam has an optical intensity distribution function shaped like a Gaussian curve.

In operation, the Gaussian beams from the LEDs 13 irradiate an end surface (not labeled) of the light guide plate 15, and may transmit in the light guide plate 15 or may be emitted out of the light guide plate 15 through an output surface (not labeled), which is perpendicular to the end surface. As seen in FIG. 5, lower intensity parts of the Gaussian beams illuminate the areas D, E, F, G between and adjacent each two LEDs 13. In some areas near the midpoint of each two LEDs 13, almost no beams are emitted out of the light guide plate 15. Darkened areas are formed near points D, E, F, and G. Therefore, the planar surface illuminator cannot produce uniform brightness over an entire area of the liquid crystal display panel.

SUMMARY OF THE INVENTION

Accordingly, an object of the present invention is to provide a planar surface illuminator which can provide highly uniform brightness to a liquid crystal display panel.

To achieve the above object, a planar surface illuminator for placement below a liquid crystal display panel comprises a light guide plate and a plurality of point light sources. The light guide plate has an optical input surface and an optical output surface. The point light sources are positioned adjacent to the optical input surface. A number of scattering dots are positioned on and integrated with the optical input surface. At least three scattering dots corresponding to each one point light source are provided, for converting a beam having a Gaussian distribution received from the point light source to a beam having a uniform light intensity which illuminates the light guide plate. This promotes uniform intensity light emission from the optical output surface to illuminate the liquid crystal display panel.

Other objects, advantages and novel features of the present invention will be apparent from the following detailed description of preferred embodiments thereof with reference to the attached drawings, in which:

DETAILED DESCRIPTION OF THE PREFERRED EMBODIMENTS

Figure 1:
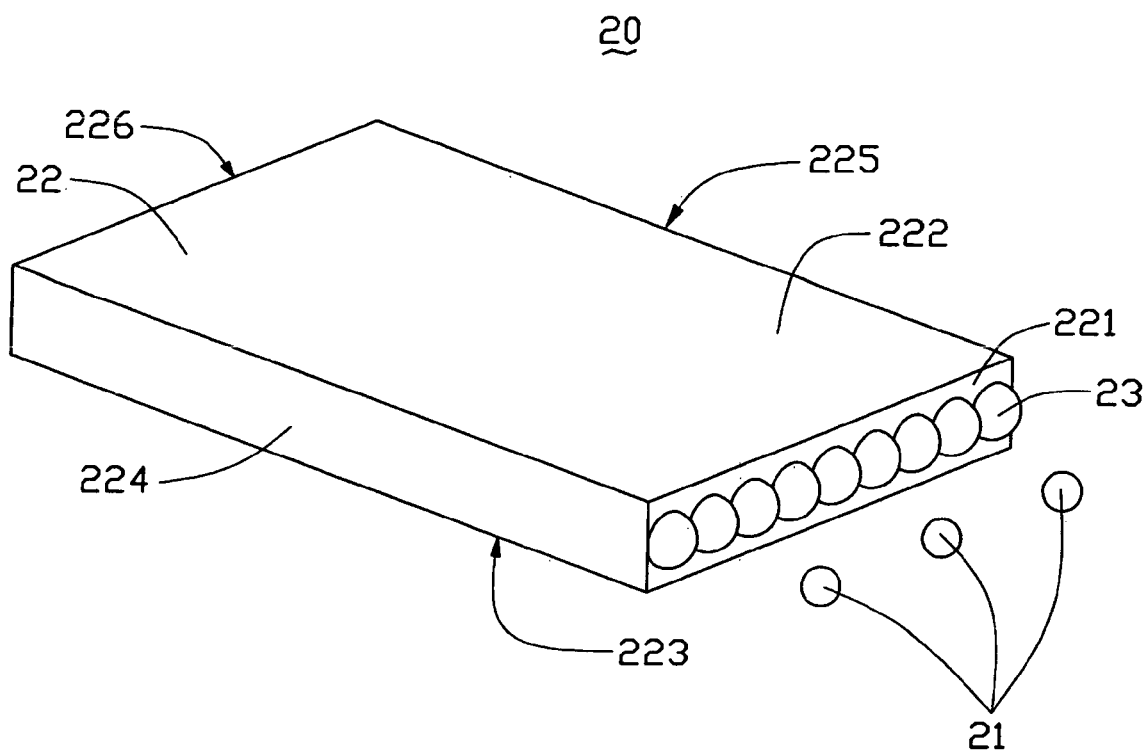
FIG. 1 is a perspective view of a planar surface illuminator constructed in accordance with a preferred embodiment of the present invention.

Referring to FIG. 1, a planar surface illuminator 20 for installation below a liquid crystal display panel (not shown) comprises an optical light guide plate 22 and a plurality of point light sources 21. The point light sources 21 can be LEDs, and are positioned to a side of the optical light guide plate 22. Light from the point light sources 21 couples with an optical input surface 221 of the optical light guide plate 22.

The optical light guide plate 22 is shaped substantially as a rectangular plane sheet, and comprises the optical input surface 221 adjacent to the point light sources 21, an optical output surface 222, a bottom surface 223, a first and a second side surfaces 224, 225, and a third side surface 226 opposite to the optical input surface 221. Alternatively, the optical light guide plate 22 can be substantially shaped as a wedge. Typically, to promote uniform emission of light from the optical output surface 222, a plurality of reflective dots (not shown) are integrally formed on the bottom surface 223. To improve energy use efficiency, reflective sheets or films (not shown) can be secured on the bottom surface 223 and the three side surfaces 224, 225, 226. The use of the reflective sheets or films ensures that virtually all the optical light beams from the point light sources 21 are eventually emitted from the optical output surface 222.

Figure 2:
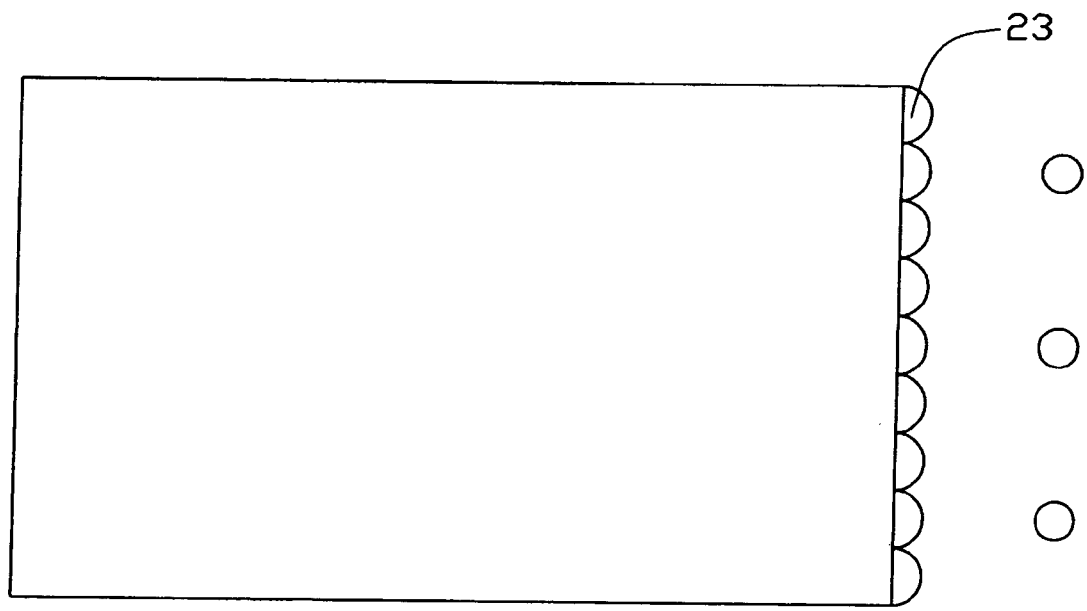
FIG. 2 is a top plan view of FIG. 1.
Figure 3:
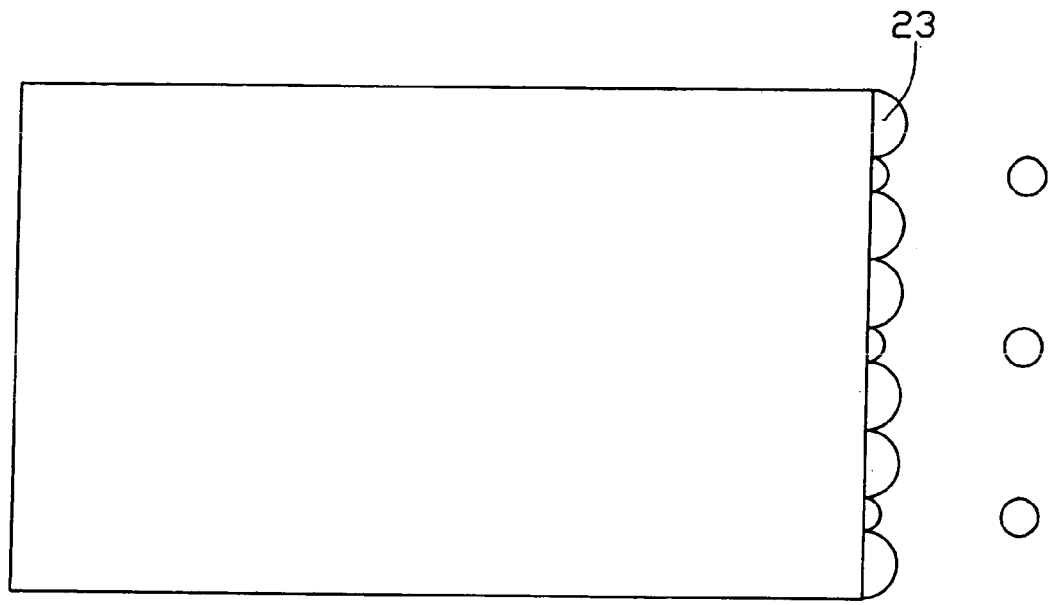
FIG. 3 is a top plan view of a planar surface illuminator constructed in accordance with a second preferred embodiment of the present invention.
Figure 4:
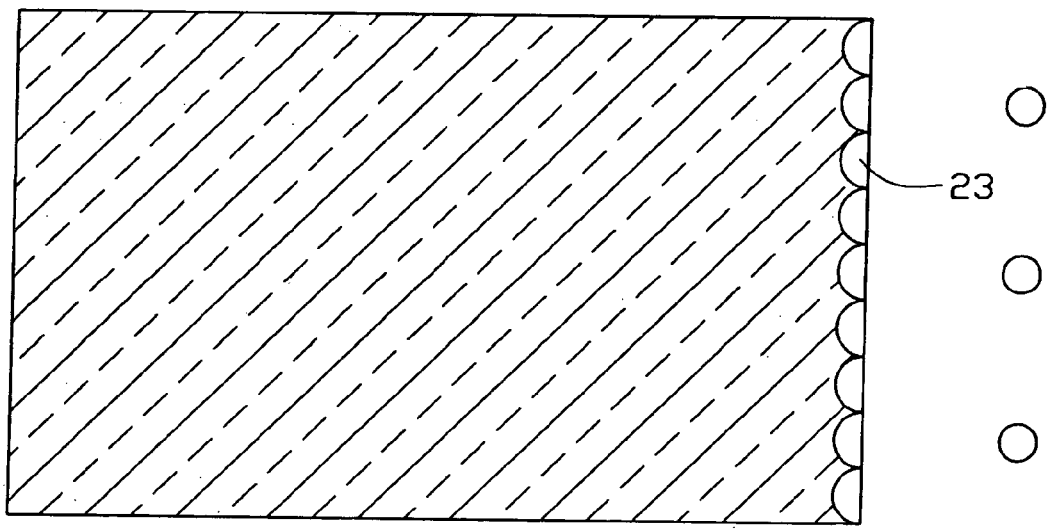
FIG. 4 is a cross-sectional view of a planar surface illuminator constructed in accordance with a third preferred embodiment of the present invention.
Figure 5:
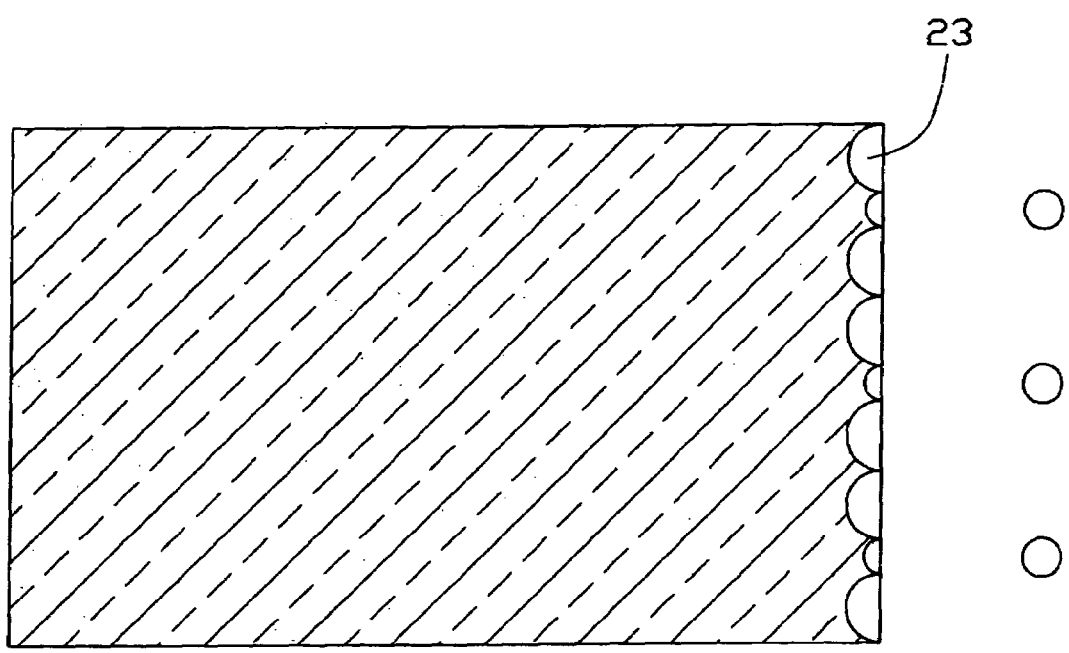
FIG. 5 is a cross-sectional view of a planar surface illuminator constructed in accordance with a fourth preferred embodiment of the present invention.

A number of scattering dots 23 are positioned on and integrated with the optical input surface 221. At least three scattering dots 23 for each one point light source 21 are provided for converting Gaussian beams emitted by the point light sources 21 to light beams having a uniform light intensity across their width. Such light beams propagate through the optical light guide plate 22 and are eventually emitted through the optical output surface 222. The scattering dots 23 can be arranged in many configurations on the optical input surface 221. Referring to FIGS. 1 and 2, the scattering dots 23 protrude outwardly from the optical input surface 221, and all have a same size. Referring to FIG. 3, in a second embodiment, sizes of the scattering dots 23 can be varied, to provide a size distribution in each group of at least three scattering dots 23, which distribution is complementary with an optical energy distribution of a Gaussian beam of the corresponding one point light source 21. This arrangement converts the Gaussian beams to beams having a uniform distribution in the light guide plate 22. Among each of the at least three scattering dots 23, the nearer a scattering dot 23 is to its corresponding point light source 21, the smaller the size of the scattering dot 23. Referring to FIGS. 4 and 5, the scattering dots 23 can also be formed as concave surfaces in the optical input surface 221. In all the FIGS. 1–5, the scattering dots 23 all have a hemispherical shape, however, they can instead have a tetrahedral shape, or any other suitable shape. The scattering dots 23 can be injection molded with, printed on, or adhered to the optical input surface 221.

Figure 6:
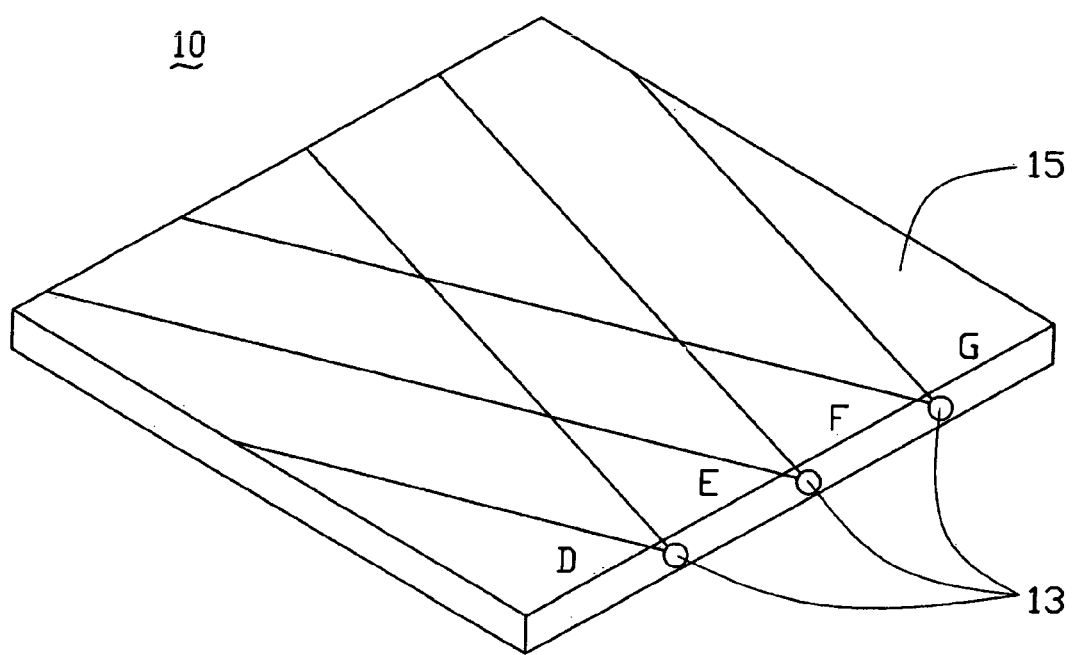
FIG. 6 is a perspective view of a conventional planar surface illuminator.

In operation, in contrast to the conventional planar surface illuminator 10 of FIG. 6, the point light sources 21 in FIG. 1 do not directly irradiate the optical input surface 221. Instead, light beams having a Gaussian distribution are emitted from the point light sources 21 and first irradiate the corresponding scattering dots 23. The scattering dots 23 convert the Gaussian beams into beams having a uniform optical energy distribution. These beams then transmit through the plane of the optical input surface 221 into the optical light guide plate 22. The beams are generally reflected and dispersed within the light guide plate 22, and eventually are emitted through the output surface 222. Formation of darkened areas, such as D, E, F, G seen in the conventional planar surface illuminator 10, is thus avoided.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A planar surface illuminator for use beneath a liquid crystal display panel, comprising:
    a light guide plate comprising an optical input surface;
    a plurality of point light sources positioned to a side of the light guide plate; and
    a number of scattering dots positioned on and integrated with the optical input surface, wherein a group of at least three scattering dots, one group for each one point light source, is present for converting Gaussian beams emitted by the point light sources to light beams having a uniform light intensity across their widths, for transmitting through the optical input surface into the light guide plate.

2. The planar surface illuminator as described in claim 1, wherein the scattering dots protrude outwardly from the optical input surface, and have a hemispherical shape or a tetrahedral shape.

3. The planar surface illuminator as described in claim 2, wherein all the scattering dots have a same size.

4. The planar surface illuminator as described in claim 2, wherein a size distribution of scattering dots in each group of at least three scattering dots is complementary with an optical energy distribution of a Gaussian beam of the corresponding one point light source.

5. The planar surface illuminator as described in claim 4, wherein among the group of at least three scattering dots, the nearer a given scattering dot is to its corresponding one point light source, the smaller the size of the scattering dot.

6. The planar surface illuminator as described in claim 1, wherein the scattering dots are formed as concave surfaces in the optical input surface, and said surfaces are hemispherical or tetrahedral in shape.

7. The planar surface illuminator as described in claim 6, wherein all the scattering dots have a same size.

8. The planar surface illuminator as described in claim 6, wherein a size distribution of scattering dots in each group of at least three scattering dots is complementary with an optical energy distribution of a Gaussian beam of the corresponding one point light source.

9. The planar surface illuminator as described in claim 8, wherein among the group of at least three scattering dots, the nearer a given scattering dot is to its corresponding one point light source, the smaller the size of the scattering dot.

10. The planar surface illuminator as described in claim 1, wherein the scattering dots are injection molded on the optical input surface.

11. The planar surface illuminator as described in claim 1, wherein the scattering dots are printed on the optical input surface.

12. The planar surface illuminator as described in claim 1, wherein the scattering dots adhere to the optical input surface.

13. The planar surface illuminator as described in claim 1, wherein the point light sources are light emitting diodes.

14. The planar surface illuminator as described in claim 1, further comprising a reflective film coated on a bottom surface of the light guide plate.

15. The planar surface illuminator as described in claim 1, further comprising a reflective sheet covering a bottom surface of the light guide plate.

16. The planar surface illuminator as described in claim 1, wherein the light guide plate is substantially shaped as a rectangular plane sheet, and further comprises an optical output surface, a bottom surface, first and second side surfaces, and a third side surface opposite to the optical input surface, the bottom surface having a plurality of reflective dots thereon.

17. The planar surface illuminator as described in claim 16, wherein the reflective dots are uniformly spaced on the bottom surface.

18. The planar surface illuminator as described in claim 1, wherein the optical light guide plate is substantially shaped as a wedge.

* * * * *